Sept. 16, 1924.
W. P. OSGOOD
CEMENTING MACHINE
Filed Jan. 25, 1919 4 Sheets-Sheet 2
1,508,469
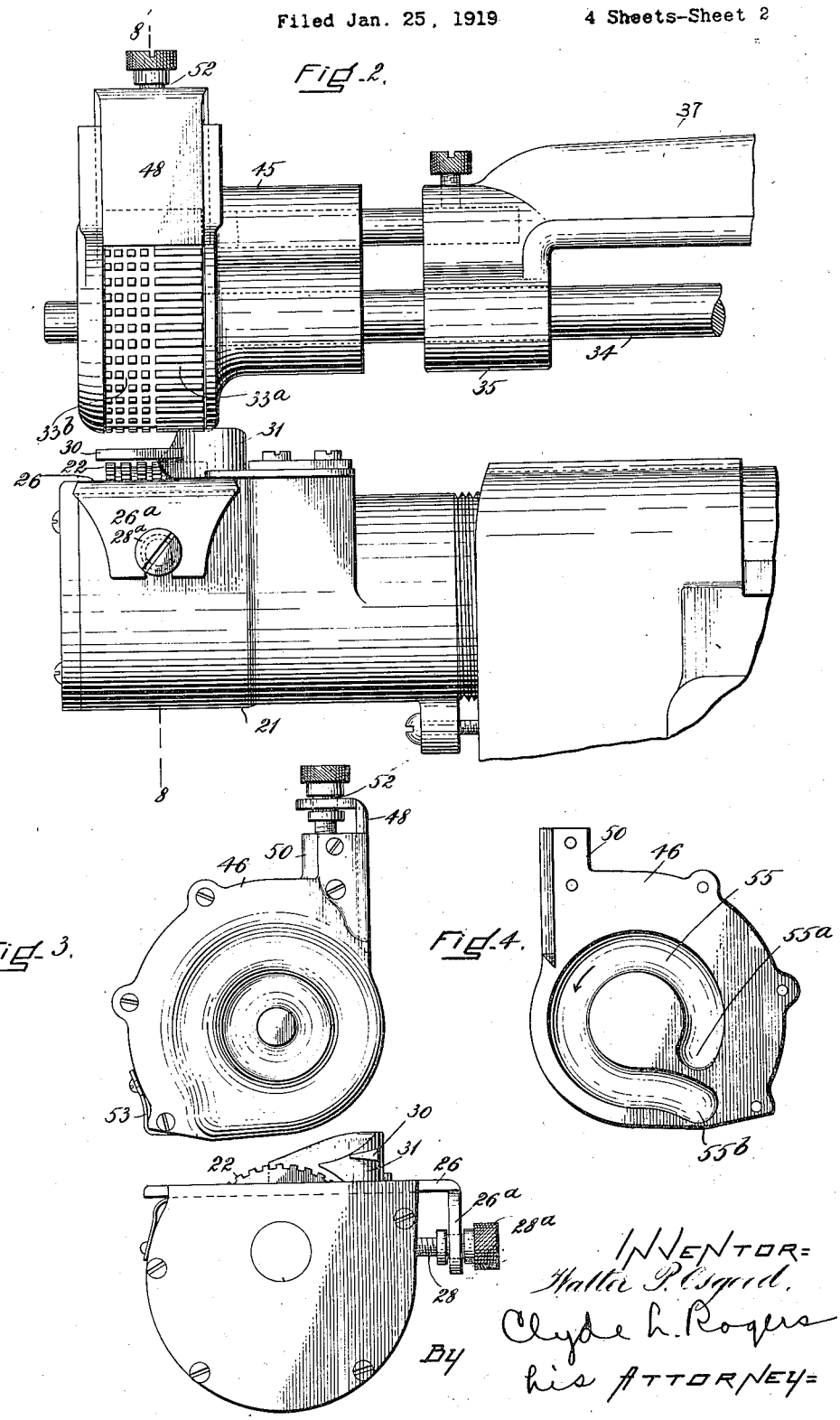

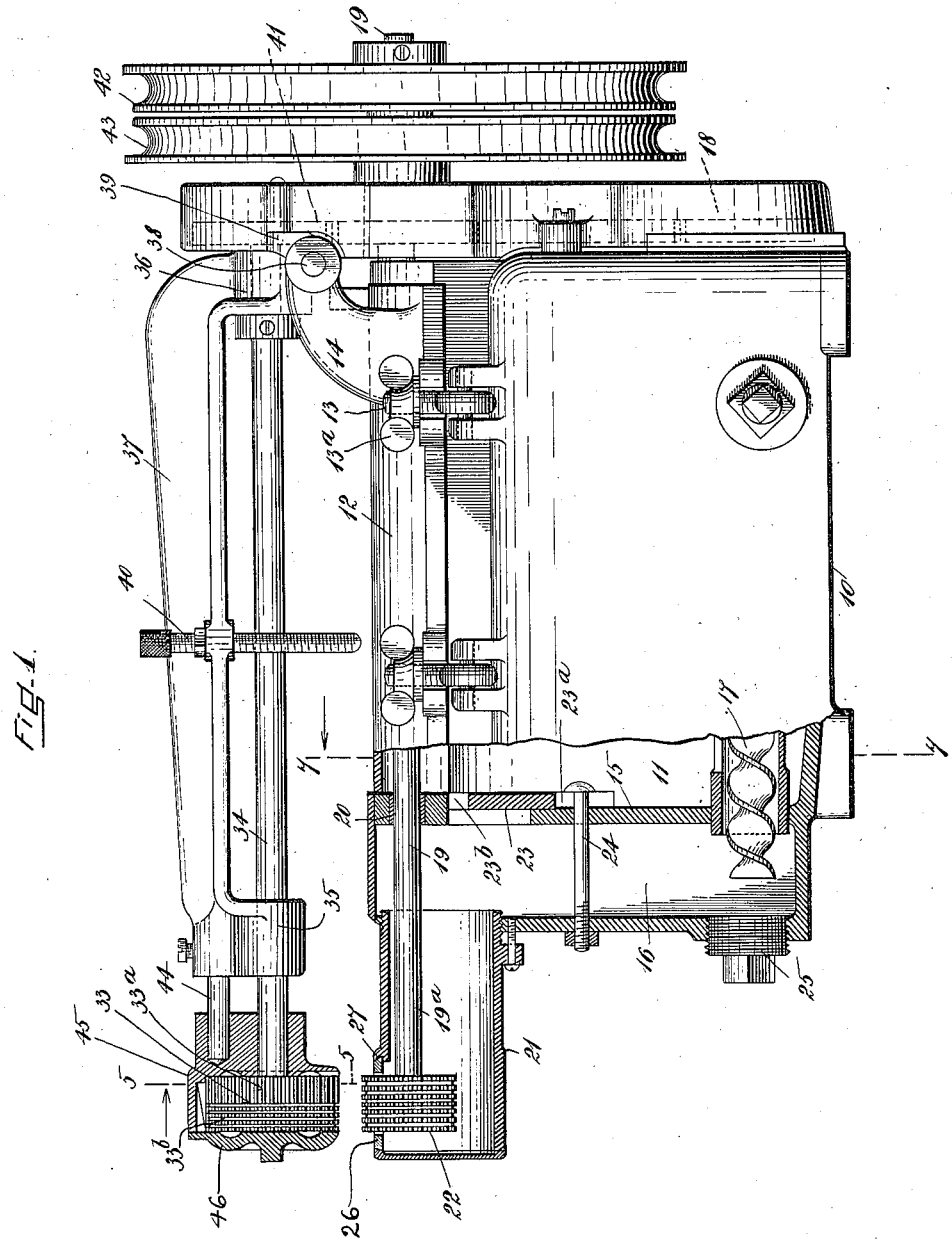

Sept. 16, 1924.  
W. P. OSGOOD  
CEMENTING MACHINE  
Filed Jan. 25, 1919  
1,508,469  
4 Sheets-Sheet 3

INVENTOR=
Walter P. Osgood,
By Clyde L. Rogers
his ATTORNEY=

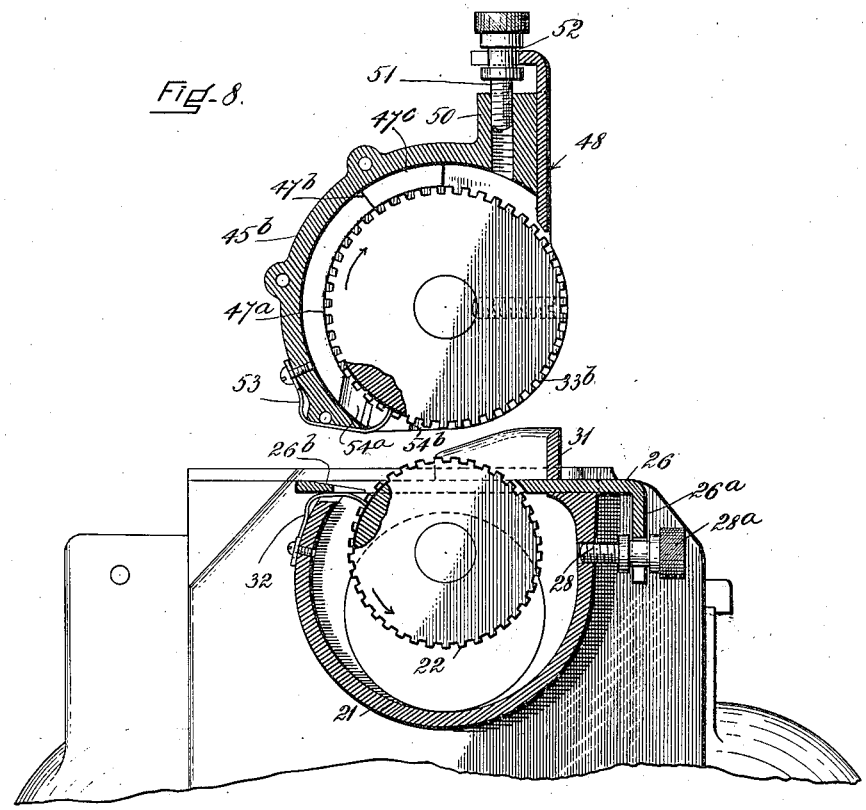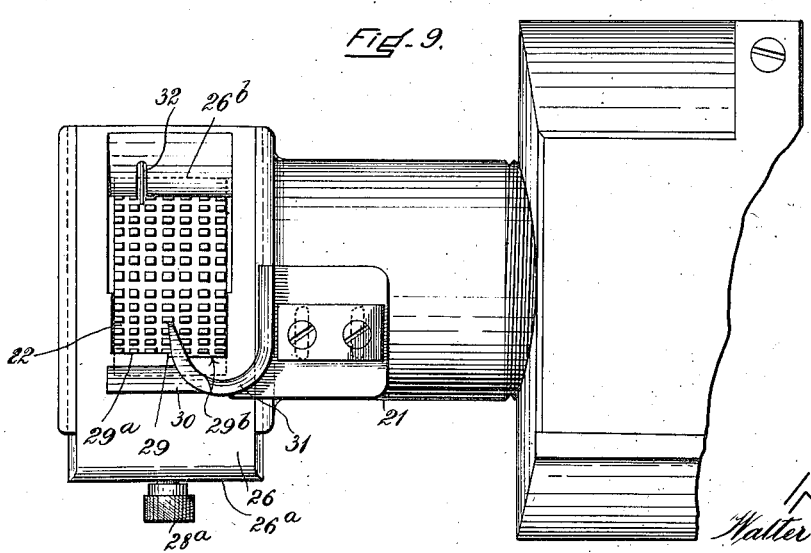

Patented Sept. 16, 1924.

1,508,469

UNITED STATES PATENT OFFICE.

WALTER P. OSGOOD, OF MALDEN, MASSACHUSETTS, ASSIGNOR TO BOSTON MACHINE WORKS COMPANY, OF LYNN, MASSACHUSETTS, A CORPORATION OF MASSACHUSETTS.

CEMENTING MACHINE.

Application filed January 25, 1919. Serial No. 273,099.

*To all whom it may concern:*

Be it known that I, WALTER P. OSGOOD, a citizen of the United States, and resident of Malden, county of Middlesex, Commonwealth of Massachusetts, have invented an Improvement in Cementing Machines, of which the following description, in connection with the accompanying drawings, is a specification, like characters on the drawings representing like parts in each of the several views.

This invention relates to cementing machines adapted to apply cement to materials such as shoe quarters placed face to face and like parts in shoe manufacture, and more particularly to a double cementer adapted to apply cement to two sides of the work as it is fed therethrough. A principal object of the invention is to provide simple yet efficient and reliable means for delivering and distributing the viscous cement in suitable quantity to each of a plurality of cement applying members adapted to act on two sides of a material or materials as they are passed simultaneously through the machine, the cement being taken from a common reservoir that may be contained with the machine. A further object is to provide means for taking care of and returning to the cement reservoir any excess of cement that may be taken up by the respective cement applying members and also any cement that may be left and partially hardened adjacent the applying members during periods of inactivity of the machine. To these ends I provide two cement laying members or rolls with their working faces adjacent each other and arranged so as to receive the supply of cement for both from a common reservoir with which the machine is equipped. A further feature of the invention consists in co-operatively forming two adjacent and opposite cement applying rolls so that the cement is taken from the reservoir by one of said rolls and a part thereof delivered thereby to the other roll which is constituted and equipped so as to gather up the cement and present the same on a working face portion thereof for application to the material, thus taking advantage of the viscous quality of the cement for gathering and distributing the same to the working surfaces of the respective rolls. A further feature of the invention consists in the mounting of a cement applying roll in a cement chamber equipped with means for delivering cement thereto from a main reservoir and having an adjustable relief or sluice gate arranged to regulate and vary the extent to which said applying roll is immersed in the cement delivered to said chamber. The foregoing and other objects and advantages of the invention will more fully appear from the following detailed description, and the distinctive features of novelty will be pointed out in the appended claims.

Referring to the drawings:

Fig. 1 is a side elevation with portions broken away in vertical section to show the operative parts, of a machine embodying my present improvements;

Fig. 2 is a partial enlarged side elevation showing the cement applying rolls and the mountings and housings therefor;

Fig. 3 is a partial end view showing the housings and mountings of the two cement applying rolls;

Fig. 4 is an elevation showing the inner side of an outer end cap of the upper roll housing;

Fig. 8 is a partial plan therefor on line 8—8 of Fig. 2; and

Fig. 9 is a partial plan view of the cementing roll and its housing chamber.

Figure 5:
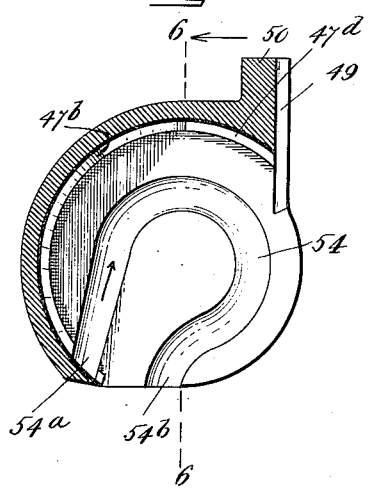
Fig. 5 is an enlarged sectional detail on line 5—5 of Fig. 1, a housing cap for the inner end of the upper roll being shown in elevation.
Figure 6:
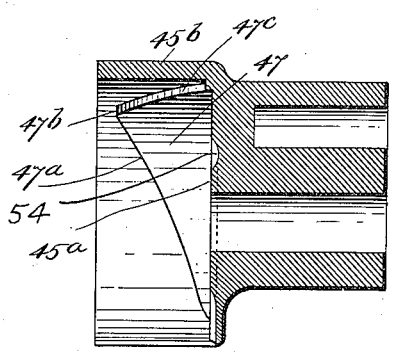
Fig. 6 is a sectional detail of the upper roll housing on line 6—6 of Fig. 5.
Figure 7:
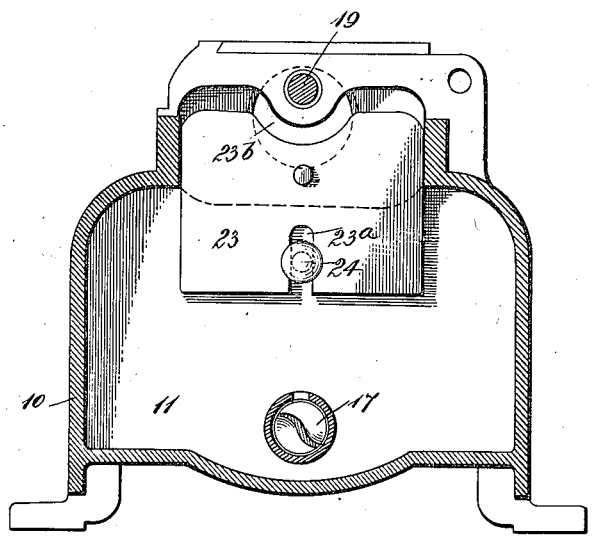
Fig. 7 is a transverse section on line 7—7 of Fig. 1.

10 indicates the machine housing and frame, the body of which is hollow to constitute a main cement reservoir 11, the top of which is normally closed by a swinging cover 12 adapted to be suitably clamped down in closed position by swinging bolts 13 and wing nuts 13ª, this cover being equipped with spaced apart upstanding lugs 14 in which the overhanging arm bearing the upper feed roll is mounted as presently described. The forward portion of the reservoir body has a vertical partition 15 extending up from the bottom thereof to constitute a vertical passage 16 at the front of the reservoir into which the cement is delivered by a suitable conveyer working in the bottom of the reservoir, this being shown as a conveyer screw 17, the stem of which is suitably journaled in the base of the reservoir and driven by spur gearing 18 from a prime drive shaft 19 which extends lengthwise and is journaled in bearings 20 near the top of the housing. The housing is equipped at the top of the front end thereof with a tubular extension or horn 21 extending out horizontally a substantial distance, this horn being of a length and transverse dimension adapted to permit work pieces having a curved periphery such as quarters and foxings to clear the main frame and other parts of the machine while they are being fed through the machine. The horn 21 communicates with the vertical passage 16 and may thus be filled with cement by the action of the screw conveyer 17. An extension 19$^a$ of the shaft 19 projects into this horn and has fixed at its extremity a cement applying roll 22 which is thus mounted adjacent the outer end of said horn to project up through the top thereof and present a working surface. It is desirable that means be provided for varying the extent to which the roll 22 is surrounded by or immersed in the cement in operation, according to the character of the cement itself and other conditions, and for this purpose I provide an adjustable sluice gate 23 at the top of the partition 15 adapted to permit the cement to flow back into the reservoir after it has reached a predetermined level in the horn 21. This sluice gate is formed at the lower portion thereof with a slot 23$^a$ through which is passed a clamp bolt 24 engageable with the housing and adapted to clamp said sluice gate to the partition 15 in different positions of vertical adjustment leaving a variable passage 23$^b$ for overflow of the cement after it reaches a predetermined level adapted to deliver the required amount to the roll 22. A screw plug 25 may be threaded into the front of the housing at the bottom thereof so as to afford access to the vertical passage 16 and the screw 17 when required. The applying roll 22 projects up through a passage therefor in a table 26 adjustably fitted to undercut ways 27 at the front top portion of the horn. This table is adjustable by having a depending extension 26$^a$ thereof in swivel engagement with a screw stem 28 threaded into the horn and equipped with a knurled head 28$^a$. The adjustment of the table 26 by the screw 28 is adapted to present an edge 29 thereof at one end of the passage therethrough as a clearer or scraper to remove excess cement from the roll 22 so that only the proper amount for application to the material and for delivery to the other roll as presently described is taken up through the table by this roll. The roll 22 is shown as grooved lengthwise and circumferentially to facilitate the taking up and application of cement thereby.

This roll is relatively wide so that while its front portion serves to apply cement directly to the work piece its back portion as presently described serves to deliver constantly in operation a cement supply to the upper cementing roll. To facilitate this action the front portion 29$^a$ of the scraper edge 29 is projected a little in advance of the rear portion 29$^b$ so that a larger quantity of cement may be taken up by the rear roll portion for delivery to the upper roll. A work gauge or guide 30 is fixed to the horn to project forwardly in position to gauge the work as it passes to the roll 22 and this gauge has formed therewith and at the rear thereof a curved wall 31 which extends up from the table some little distance over the scraper edge portion 29$^b$ and serves as a retainer of the extra cement which is brought up by the rear portion of the roll 22 so that it is ready for delivery to the upper roll. A spring wire 32 is fixed to the horn and presents a bent-in extremity to engage in a circumferential groove at the outer portion of the roll 22, this being just below the table 26 and for the purpose of insuring the clearing of the work from the roll. The rear end of the table 26 is shown at 26$^b$ as beveled inwardly to further facilitate the clearance of the work and the easy sliding movement of the same thereon from the roll.

In accordance with my invention a relatively wide faced upper roll 33 is mounted directly over the roll 22 for co-operation therewith, this roll being fixed at the outer end of a shaft 34 journaled in bearings 35, 36 at the outer and inner ends respectively of an overhanging arm 37 which is pivoted at 38 to the upstanding lugs 14 already described. This arm has its limits of swinging movement limited in an upward direction by a lug 39 thereon which engages the stationary abutment on the housing while its lower limit of movement is determined by the adjustment of a screw bolt 40 carried by said arm and adapted to impinge on the housing cover. It will be understood that the arm 37 normally occupies its lower limit of movement in which the rolls 22, 33 are in close contact, and a suitable spring (not shown) may if desired be employed to supplement the action of gravity in holding the arm in this lowermost position, it being understood that the tension on the arm should be such that as material pieces are introduced between the rolls, the upper roll 33 carried by the swinging arm may yield upward readily to accommodate variations in thicknesses of stock. The shaft 34 is driven by gearing 41 from the shaft 19, such gearing being so proportioned as to turn the rolls 22—33 at the same peripheral speed, i. e., since the roll 33 is shown as substantially larger than the roll 22 the shaft 34 is correspondingly geared down with respect to the shaft 19. A projecting end of the shaft 19 is equipped with a fast pulley 42 and a loose pulley 43 as usual for the application of power to the machine. The forward end of the overhanging arm 37 has adjustably socketed and clamped therein a pin or bar 44 which has fixed thereto a housing head 45 for the upper roll 33. This housing head comprises a rear wall $45^a$ and a peripheral wall $45^b$ encircling the roll 33 except for an opening at the bottom through which the working surface of the roll projects. A removable cap 46 secured to the outer end of the head 45 completes the housing of the roll 33. In accordance with my invention the peripheral wall $45^b$ of this housing head has its inner surface formed with an inwardly projecting ledge or abutment 47 which presents an inclined edge $47^a$ extending from the rear of the wall $45^b$ at the bottom thereof toward the front end of said wall to near the top thereof where as indicated at $47^b$ it is near the front end of the housing wall $45^b$ and hence near the front of the roll 33. Thence the abutment edge recedes abruptly as indicated at $47^c$ again to the back of the wall leaving a chamber $47^d$ of some little extent just in advance of a scraper 48 which is mounted for vertical adjustment in undercut ways 49 in a boss 50 formed with the housing wall $45^b$. The scraper 48 is adjustable into more or less close contact with the roll 33 by means of a thumb screw 51 set into the boss 50 and swiveled to an inturned extension of the scraper as indicated at 52, said adjusting screw being thus in parallelism with the scraper. The ledge or abutment 47 fits closely the periphery of the roll 33 and in operation the inclined edge $47^a$ thereof serves to wipe and press the cement from the back side of the roll 33 which it will be noted serves as a cement gathering surface, to the front side thereof which constitutes the working surface for applying the cement to the material. The chamber $47^d$ just in advance of the scraper plate serves as an equalizing supply, or surplus distributing chamber adapted in conjunction with the scraper to equalize and apportion the cement over the working surface of the roll insuring an uninterrupted and regular delivery and application of the cement. It will be noted that the rear portion $33^a$ of the roll 33 which as stated serves to gather and take up the cement from the lower roll, is equipped with grooves extending widthwise thereof only while the front portion $33^b$ which constitutes the applying surface is grooved both widthwise and circumferentially like the roll 22. A spring wire 53 is adjustably secured to the housing wall $45^b$ and has its free end bent inwardly to engage in a circumferential groove of the roll 33 to serve as a clearance member like the wire 32. The rear or inner wall $45^a$ of the housing head 45 is formed with a scroll groove 54 extending as seen at $54^a$ from the periphery of the housing adjacent the point to which the roll delivers the cement, upward and around the axis with a delivery $54^b$ adapted to discharge back into the reservoir, i. e., into the chamber formed by the curved wall 31 adjacent the lower roll 22. The function of this groove is to furnish an outlet so that the movement of the roll may move forward and clear out any cement that may work in at the end thereof and partially harden during a period of inactivity of the machine. The outer cap plate 46 is formed with a similar scroll groove 55, this extending in the direction of roll movement from a point $55^a$ relatively closer to the axis around the same to an outer extremity $55^b$ relatively farther from the axis and at the periphery of the roll, the purpose of this being likewise to facilitate the clearing out of cement at the end of the roll, in this case by bringing it out to the periphery of the wheel so that it may be taken up thereby. The operation of the machine having been explained in connection with the several features of construction need not be repeated at length. The material being inserted between the rolls while they are running in close contacting relation, they are pressed apart thereby according to the thickness of the material, the upper roll 33 for this purpose yielding upward and both rolls being driven as described at the same peripheral speed they cooperate as feeding rolls to advance the material through the machine and at the same time apply a cement coating to both sides of the material, the amount of cement applied being regulated by the respective scrapers 26, 48, and further by the adjustment of the sluice gate 23 which initially determines the amount of cement that will be taken up by the lower roll 22. One purpose of this sluice gate is to control the delivery of cement by the conveyer 17 so that it will not ever be excessive enough to ooze up around the roll even when the machine may be running idle for some little time. I believe it to be broadly new in a double cementer to provide two cement laying members with working faces adjacent and receiving their supply of cement from a common reservoir, and also to provide oppositely mounted cement applying rolls arranged so that one thereof gathers its supply of cement from the other thereof. I therefore desire the present embodiment as to these features as well as to the other features disclosed to be considered as illustrative and not restrictive and refer to the appended claims rather than to the foregoing description to indicate the scope of the invention.

Having described my invention, what I claim as new and desire to secure by Letters Patent is:

1. A cementing machine of the kind described, comprising two cement laying members having working faces adjacent and co-operative to apply cement to two sides of material at the same time, and a cement reservoir supplying one of said members directly, said members having co-operative equipment for the transfer of cement from one thereof to the other, and for the application of the cement so transferred to a side of the material.

2. A cementing machine of the kind described, comprising a pair of cement applying rolls mounted for co-operation to apply cement to two sides of material, said rolls having an equipment for gathering and delivering cement from one thereof to the other with the machine in operation and while applying cement to a work piece.

3. A cementing machine of the kind described, comprising a pair of applying rolls mounted for co-operation to apply cement to two sides of material, one thereof having a cement reservoir associated therewith, and the other roll having an equipment to gather cement from said first mentioned roll constantly while said rolls are in proximity one to the other and apply the same to the material.

4. A cementing machine, comprising a plurality of applying rolls, one thereof equipped with a surface portion adapted to gather cement from another thereof during the period of operation, said first roll also having an equipment to transfer such cement from a gathering surface portion thereof to an applying surface portion thereof, and said other roll having a surface portion adapted to gather cement and present it to the first named roll.

5. A double cementing machine, comprising a cement reservoir, an applying roll mounted to gather cement therefrom, a second applying roll equipped with a surface portion adapted to gather cement from the first named roll, and means associated with the second roll for transferring the cement from a gathering surface thereof to an applying surface thereof the first named roll having a surface portion adapted to gather cement and present it to the second named roll.

6. A double cementing machine, comprising a cement reservoir, an applying roll mounted to gather cement therefrom, a second applying roll mounted opposite the first named roll and co-operative therewith and equipped with a surface portion adapted to gather cement from the first roll, and a relatively stationary wiper device mounted and arranged to transfer the cement from a gathering portion of the second roll to an applying portion thereof, the first named roll having a surface portion adapted to gather cement and present it to the second named roll.

7. A double cementing machine, comprising a pair of applying rolls mounted for co-operation to cement simultaneously two sides of work presented, one of said rolls having a cement reservoir associated therewith and having an extension adapted to deliver cement to the second roll, and said second roll having a working surface and an extension to gather such cement and also an equipment for transferring the same onto the working surface thereof constantly during operation.

8. A double cementing machine, comprising a pair of oppositely mounted relatively wide faced rolls, one thereof having a cement reservoir associated therewith from which it takes up cement, and the other roll having a surface portion adapted to gather cement from the first named roll, and equipped with wiper means adapted to transfer the same from a gathering surface portion to a working surface portion thereof, the first named roll having a surface portion adapted to gather cement and present it to the second named roll.

9. A double cementing machine, comprising a pair of oppositely mounted relatively wide faced rolls, one thereof having a cement reservoir associated therewith from which it takes up cement, and the other roll having a surface portion adapted to gather cement from the first named roll, equipped with wiper means adapted to transfer the same from a gathering surface portion to a working surface portion thereof, and also equipped with an adjustable scraper member and with a surplus distributing chamber just back of said scraper adapted to apportion the cement, the first named roll having a surface portion adapted to gather cement and present it to the second named roll.

10. A cementing machine, comprising an applying roll, and an enclosing housing therefor, an end of said housing formed and equipped to promote the clearance of cement from the roll end, and the movement thereof to the roll periphery.

11. A cementing machine, comprising an applying roll, and an enclosing housing therefor, said housing formed at an end thereof with a clearance groove adapted to promote the movement of cement outward from the roll end for the purpose stated.

12. A cementing machine, comprising an applying roll, and an enclosing housing therefor having its ends formed with scroll grooves adapted to promote the clearance of cement from the roll ends, one of said grooves formed to return the cement outward to the source of supply, and the other thereof formed to deliver the cement to the roll periphery.

13. A double cementing machine comprising a pair of oppositely mounted rolls, one thereof having a cement reservoir associated therewith from which it takes up cement, and the other roll having a surface portion adapted to gather cement from the first named roll, the second named roll having a surplus distributing chamber associated therewith adapted to receive the cement from said roll while the machine is running idle and providing a temporary supply therefor.

14. A double cementing machine comprising a pair of oppositely mounted relatively wide faced rolls, one thereof having a cement reservoir associated therewith from which it takes up cement and other roll having a surface portion adapted to gather cement from the first named roll, the second named roll equipped with an adjustable scraper member and with a relatively small surplus distributing chamber adjacent said scraper member adapted to apportion the cement as set forth.

15. A cementing machine, comprising a cement gathering and laying roll having means associated therewith to gather and store cement while the machine is running with a work piece therein and having equipment to lay cement from the same surface thereof during the period of operation.

16. A cement machine, comprising a cement reservoir, a cementing roll mounted therein, and a second cementing roll cooperative therewith having a surface equipped to gather cement while the machine is running with a work piece therein from the first named roll while in proximity thereto and equipped also to lay cement from the same surface thereof during the period of operation.

17. A cementing machine of the kind described, comprising two cement applying rolls, one thereof having an equipment to gather cement from a surface adjacent the applying portion of the other thereof, and the second roll having a surface portion adapted to present cement to the first named roll.

18. A double cementing machine comprising two cement applying rolls, one thereof receiving its supply directly from a body of cement and the other roll having an equipment for gathering and storing cement between periods of operation.

19. A double cementing machine comprising two cement applying rolls disposed so as to apply cement to opposite sides of interposed material, one roll thereof equipped to receive a supply from a body of cement and the other roll having equipment to take up and transfer cement while the machine is running without a work piece therein and having also means associated therewith for storing a temporary supply of cement.

20. In a gluing machine, a gluing roll, a supplemental roll associated therewith, and adapted to have one portion of its surface to rotate in contact with said gluing roll and the other portion rotating in contact with a strip of paper or similar material passing over said gluing roll, and means for transferring glue from the portion of the supplemental roll which rotates in contact with said gluing roll to the portion which rotates in contact with said strip of paper or similar material.

21. In a gluing machine, a gluing roll, a supplemental roll in rotatable contact therewith along part of the periphery of said supplemental roll, another part of said periphery being out of contact with said gluing roll and means for transferring glue from the part which contacts to the part which does not contact with said gluing roll.

In testimony whereof, I have signed my name to this specification.

WALTER P. OSGOOD.